United States Patent
Tessier et al.

(10) Patent No.: US 10,179,438 B2
(45) Date of Patent: Jan. 15, 2019

(54) METHOD AND ASSEMBLY FOR MANUFACTURING DOOR SKIN AND WALL WITH DOORWAY

(71) Applicant: Bell Helicopter Textron Inc., Fort Worth, TX (US)

(72) Inventors: Sylvain Tessier, Fassett (CA); Richard Gingras, Montreal (CA); Jacques Dionne, Saint-André-d'Argenteuil (CA); Bryan Linington, Perth (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 182 days.

(21) Appl. No.: 15/273,775

(22) Filed: Sep. 23, 2016

(65) Prior Publication Data

US 2018/0086010 A1    Mar. 29, 2018

(51) Int. Cl.
| | |
|---|---|
| *B29C 70/38* | (2006.01) |
| *B29C 70/34* | (2006.01) |
| *B29C 70/54* | (2006.01) |
| *B64C 1/12* | (2006.01) |
| *B64C 1/14* | (2006.01) |

(Continued)

(52) U.S. Cl.
CPC ............ *B29C 70/382* (2013.01); *B29C 70/30* (2013.01); *B29C 70/34* (2013.01); *B29C 70/545* (2013.01);

(Continued)

(58) Field of Classification Search
CPC ..... B29C 70/34; B29C 70/382; B29C 70/545; B64C 1/1461; B64C 1/12; B29L 2031/3082; B29K 2105/06
See application file for complete search history.

(56) References Cited

U.S. PATENT DOCUMENTS

| | | | |
|---|---|---|---|
| 6,151,848 A | 11/2000 | Hunter | |
| 6,619,372 B2 | 9/2003 | Bold et al. | |

(Continued)

FOREIGN PATENT DOCUMENTS

| | | |
|---|---|---|
| CA | 1117408 | 2/1982 |
| CA | 2743372 C | 12/2013 |

(Continued)

OTHER PUBLICATIONS

Office Action in related Canadian Patent Application No. 2,943,533, dated Nov. 21, 2017, 4 pages.

*Primary Examiner* — Vishal I Patel

(57) ABSTRACT

A method of manufacturing a door skin and a fuselage wall having a doorway and a member extending into the doorway for abutting the door includes placing a first sheet of uncured composite material on a mold plate to define the door and fuselage skin, disposing an insert over the first sheet overlapping a desired periphery of the door, placing a second sheet of uncured composite material on a peripheral portion of the insert and over the first sheet adjacent the peripheral portion of the insert to form the member, curing the sheets and bonding the sheets together adjacent the insert during the cure, removing the insert from between the sheets after cure, and separating the door skin from the wall skin after cure by moving a cutting tool through the first sheet and without penetrating the second sheet around the desired periphery of the door. An assembly for manufacturing the door skin and a fuselage wall is also discussed.

14 Claims, 4 Drawing Sheets

(51) Int. Cl.
  *B29C 70/30* (2006.01)
  *B64C 27/04* (2006.01)
  *B64F 5/10* (2017.01)
  *B29K 105/06* (2006.01)
  *B29L 31/30* (2006.01)
  *B29L 31/00* (2006.01)

(52) U.S. Cl.
  CPC .............. *B64C 1/12* (2013.01); *B64C 1/1461* (2013.01); *B64C 27/04* (2013.01); *B64F 5/10* (2017.01); *B29C 2793/009* (2013.01); *B29C 2793/0018* (2013.01); *B29K 2105/06* (2013.01); *B29L 2031/3082* (2013.01); *B29L 2031/724* (2013.01)

(56) References Cited

U.S. PATENT DOCUMENTS 8,146,863 B2 4/2012 Larcher
8,398,910 B2 3/2013 Kastner et al.
8,622,346 B2 1/2014 Buchs et al.
8,800,927 B2 8/2014 Schimmler et al.
8,940,215 B2 1/2015 Milliere
2011/0052845 A1 3/2011 Dermond
2015/0064389 A1 3/2015 Zahlen et al.

FOREIGN PATENT DOCUMENTS

| | | | |
|---|---|---|---|
| CA | 2714175 C | 6/2016 | |
| DE | 102009057010 A1 | 6/2011 | |
| EP | 2284076 A1 | 2/2011 | |
| EP | 2415662 B1 | 7/2012 | |
| EP | 2842865 A1 * | 3/2015 | ........... B64C 1/1492 |
| EP | 2842865 A1 | 3/2015 | |
| KR | 100408833 B1 | 11/2003 | |
| WO | WO 2009/098088 A2 | 8/2009 | |
| WO | WO 2011/066950 A1 | 6/2011 | |

* cited by examiner

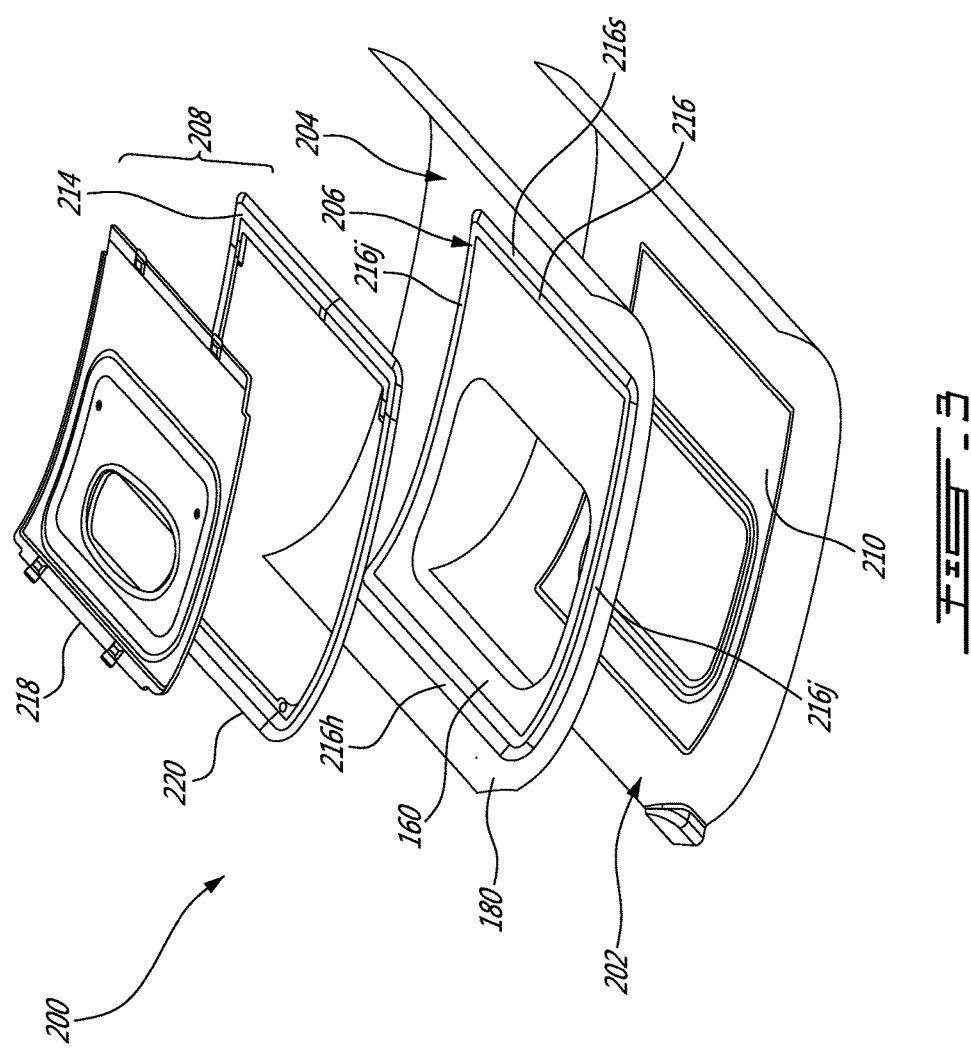

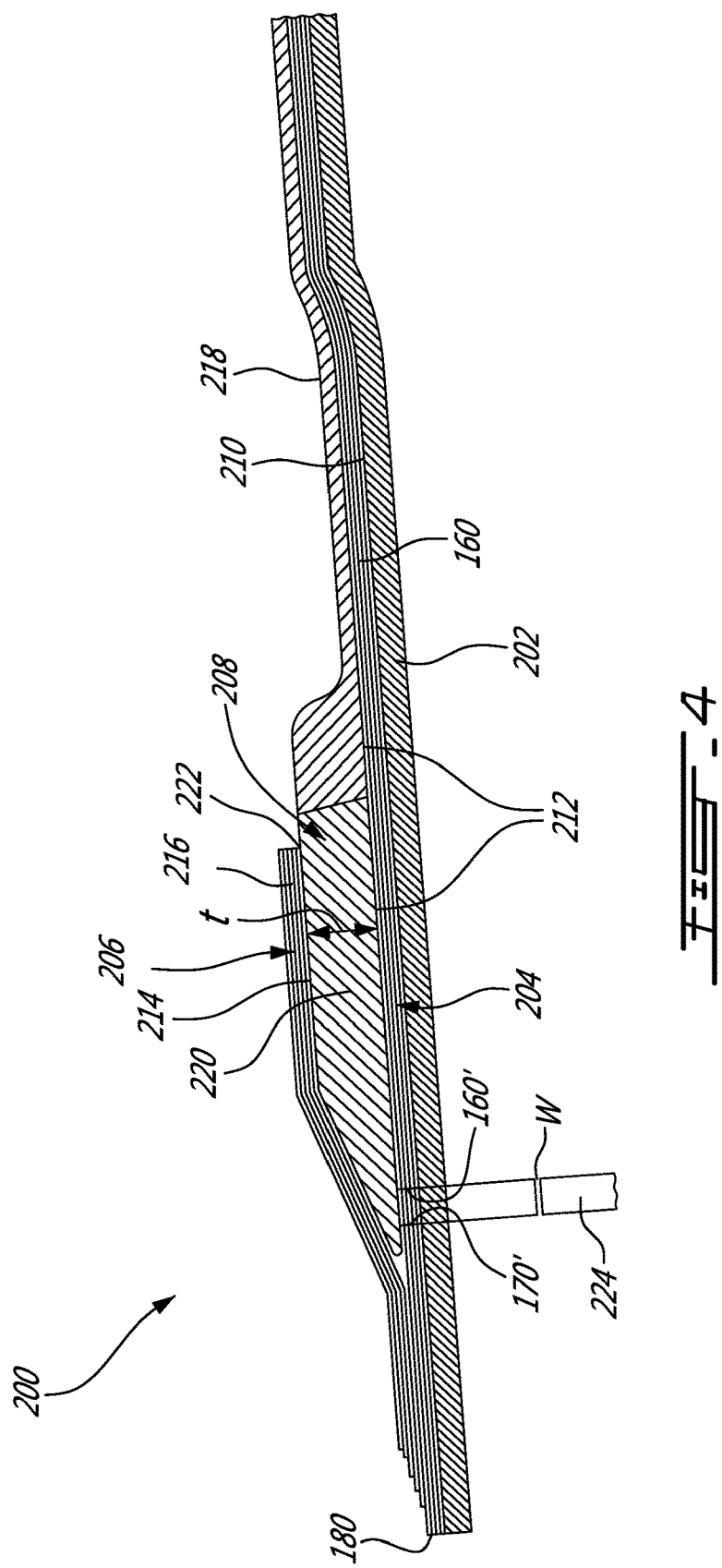

METHOD AND ASSEMBLY FOR MANUFACTURING DOOR SKIN AND WALL WITH DOORWAY

FIELD OF THE INVENTION

The application relates generally to the manufacture of composite structures and, more particularly, to the manufacture of composite structures including doorways and doors received therein.

BACKGROUND OF THE INVENTION

Aircraft fuselage parts configured to include a door are typically manufactured by forming the fuselage wall including the doorway and support structure surrounding the doorway, and separately forming the door to be received in the doorway. For example, the inner and outer skin of a door can be laid-up and cured in separate tools independently from the manufacture of the fuselage wall. Accordingly, dimensional tolerances for the door and for the doorway defined through the fuselage wall must be met to ensure a proper fit of the door upon assembly.

SUMMARY OF THE INVENTION

In one aspect, there is provided a method of manufacturing a door skin of a door and a fuselage wall having a doorway configured to receive the door, the fuselage wall including a member extending into the doorway for abutting the door, the method comprising: placing a first sheet of uncured composite material on a mold plate to define the door skin and a skin of the fuselage wall around the doorway; disposing an insert over the first sheet, the insert overlapping a desired periphery of the door; placing a second sheet of uncured composite material on a peripheral portion of the insert and over the first sheet adjacent the peripheral portion of the insert to form the member; curing the first and second sheets, the first and second sheets bonding together adjacent the peripheral portion of the insert during the cure; after the cure, removing the insert from between the first and second sheets; and after the cure, separating the door skin from the skin of the fuselage wall by moving a cutting tool through the first sheet and without penetrating the second sheet, the cutting tool moving around the desired periphery of the door.

In another aspect, there is provided a method of manufacturing a door skin of a door and a wall having a doorway configured to receive the door, the wall including a member extending into the doorway for abutting the door, the method comprising: placing a first composite material on a mold plate configured to define a first surface of the door skin and of a skin of the wall, the first composite material being uncured; disposing an insert on the first composite material with a first mold surface of the insert against the first composite material, the first mold surface configured to define a second surface of the door skin, the insert having an opposed second mold surface configured to define the member, the insert overlapping a desired periphery of the door; disposing a second composite material on the second mold surface of the insert and on the first composite material adjacent the insert, the second composite material being uncured; curing the first and second composite materials to respectively form first and second cured sheets, wherein contacting portions of the first and second composite materials bond together during cure; removing the insert from between the first and second cured sheets; and separating the door skin from the skin of the wall by moving a cutting tool through the first cured sheet and without penetrating the second cured sheet, the cutting tool moving around the desired periphery of the door.

In a further aspect, there is provided an assembly for manufacturing a door skin of a door and a fuselage wall having a doorway configured to receive the door, the assembly comprising: a mold plate having a mold surface; a first sheet of composite material overlaying the mold surface of the mold plate and defining the door skin and a skin of the fuselage wall; an insert disposed on the first sheet, the insert overlaying a first portion of the first sheet defining the door skin and a second portion of the first sheet defining the skin of the fuselage wall around the doorway; a second sheet of composite material overlaying a peripheral portion of the insert and bonded to the first sheet adjacent the peripheral portion, the second sheet defining a member extending into the doorway for abutting the door; wherein the insert is formed of at least two parts detachably interconnected to one another so as to be removable from between the first and second sheets.

BRIEF DESCRIPTION OF THE DRAWINGS

Reference is now made to the accompanying figures in which:

FIG. 3 is a schematic exploded tridimensional view of the assembly of FIG. 2; and FIG. 4 is a schematic cross-sectional view of the assembly of FIG. 2, taken along lines 4-4.

DETAILED DESCRIPTION

Illustrative embodiments of the methods and apparatuses are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
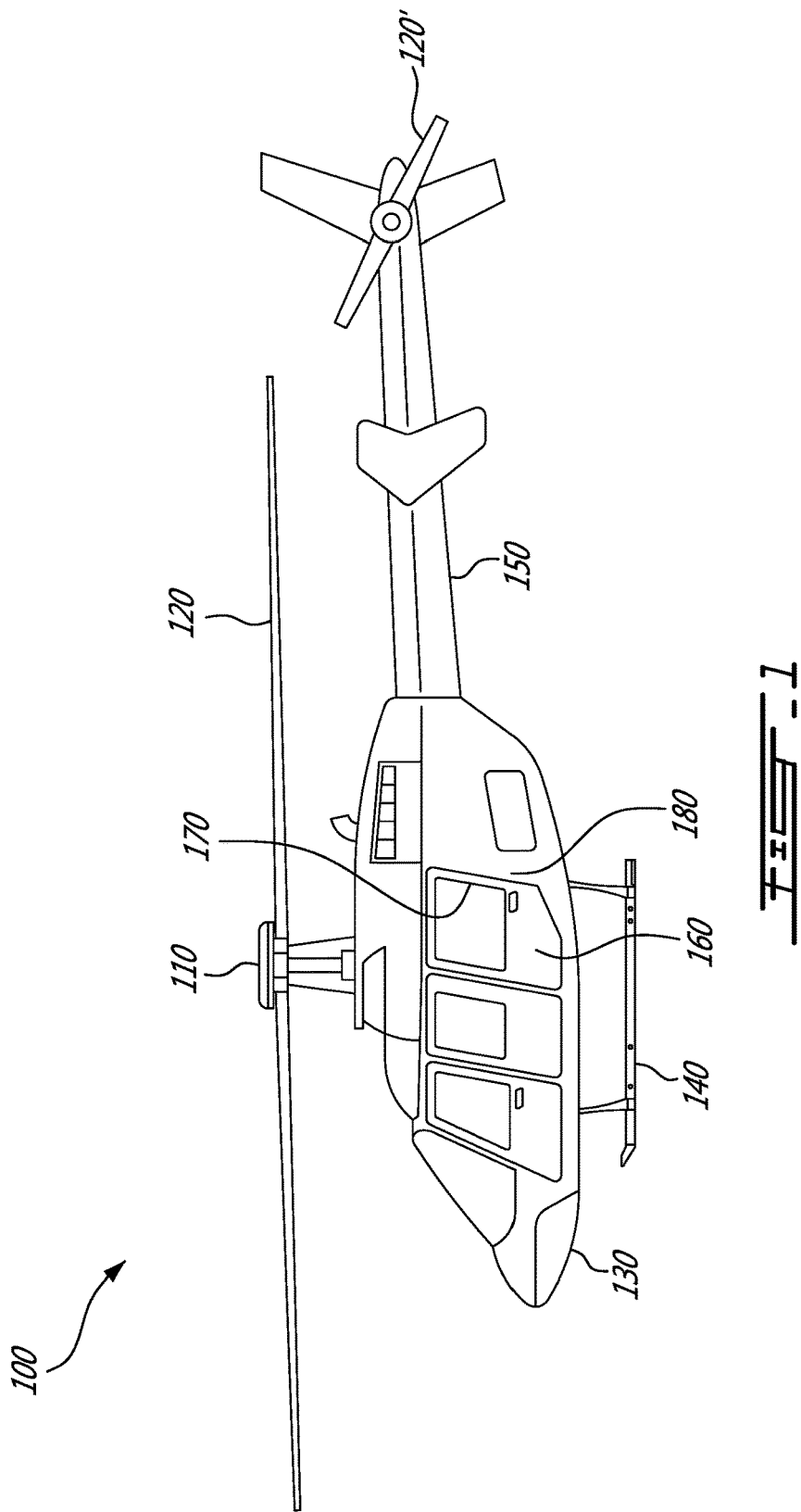
FIG. 1 is a schematic side view of a rotorcraft in accordance with a particular embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. It should also be appreciated that teachings regarding rotorcraft 100 may apply to aircraft and vehicles other than rotorcraft, such as airplanes and unmanned aircraft, to name a few examples.

The fuselage 130 includes one or more door(s) each having an outer door skin 160, and each received in a corresponding doorway 170 defined through an outer wall skin 180 of the fuselage 130. The present disclosure provides for a method and assembly for manufacturing the door skin 160 together with part of the fuselage wall defining the doorway 170 receiving the door, including the surrounding wall skin 180. The door and wall skins 160, 180 are manufactured as a single piece, and then separated from one another using a cutting tool. Accordingly, the shape and dimensions of the door skin 160 correspond to that of the doorway 170, since both are defined at the same time and in a complementary manner.

Figure 2:
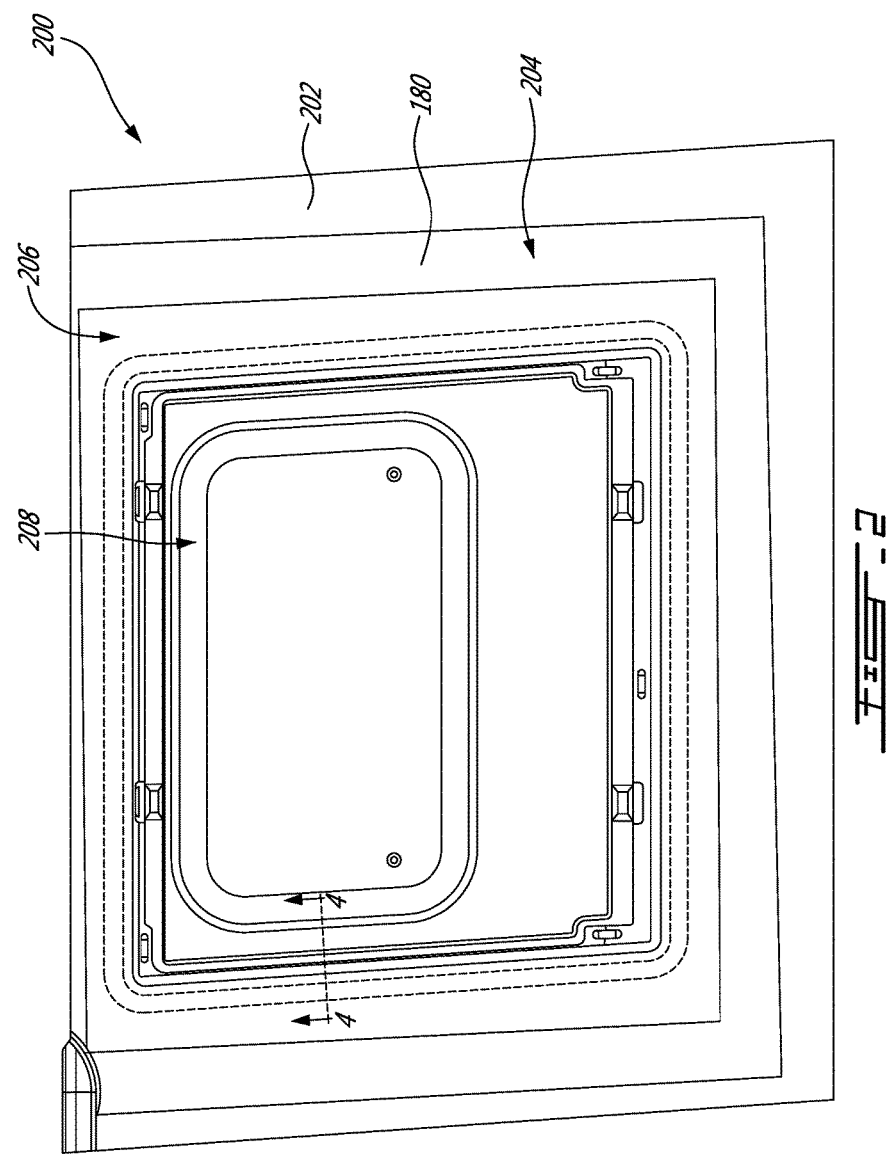
FIG. 2 is a schematic top view of an assembly for manufacturing a door skin and a wall having a corresponding doorway, in accordance with a particular embodiment.

Referring to FIGS. 2-4, an assembly 200 according to a particular embodiment is shown, including the door skin 160 and part of the fuselage wall as configured after layup of the composite, and before the door and fuselage skins 160, 180 are separated. The assembly 200 generally includes a mold plate 202, two sheets 204, 206 of composite material, and an insert 208 received between the two sheets of composite material.

As can be best seen in FIGS. 3-4, the mold plate 202 has a mold surface 210 configured to define a first surface of the door skin 160 and of the adjacent wall skin 180. In the embodiment shown, the first surfaces defined by the mold plate 202 are the outer surfaces of the door and wall skins 160, 180.

The first sheet 204 of composite material is received against the mold surface 210 of the mold plate 202 to define the door and wall skins 160, 180. The first sheet 204 may include multiple layers or plies of composite material in a laminate configuration. In the embodiment shown, the first sheet 204 is continuous; alternatively, the first sheet 204 may include two or more pieces suitably joined.

The insert 208 is received on the first sheet 204. The insert 208 has a first mold surface 212 (see FIG. 4) in contact with the first sheet 204, configured to define the surface of the door skin 160 opposed from the mold plate 202, which in the embodiment shown corresponds to the inner surface of the door skin 160.

The insert 208 also has another mold surface 214 opposed and spaced from the first mold surface 212 and the first sheet 204; this second mold surface 214 is configured to define a frame member 216 of the wall. The frame member 216 extends from the wall into the doorway, inwardly spaced from the wall skin 180. In use, and in a particular embodiment, the inner surface of the door abuts the frame member 216 when closed, for example, to provide a sealed engagement between the closed door and the fuselage wall. Accordingly, in the embodiment shown and as can be seen in FIG. 3, the frame member 216 extends around the complete periphery of the doorway, and defines a sill $216s$, a header $216h$, and two opposed jambs $216j$ interconnecting the sill $216s$ and the header $216h$.

The insert 208 has a periphery and a surface area which are slightly larger than the desired periphery of the door and doorway, so that the insert 208 overlaps the desired periphery of the door. The insert 208 accordingly covers the portion of the first sheet 204 defining the door skin 160 and extends over the portion of the first sheet 204 defining the wall skin 180 around the doorway, as will be further detailed below.

As can be best seen in FIG. 4, the second sheet 206 of composite material is received on the second mold surface 214 of the insert 208 and on the first sheet 204 adjacent the insert 208, so as to define the frame member 216 connected to the wall skin 180. The second sheet 206 may include multiple layers or plies of composite material in a laminate configuration. In the embodiment shown, the second sheet 206 is continuous; alternatively, the second sheet may include two or more pieces suitably joined. In a particular embodiment, the two sheets 204, 206 are made of the same material.

Referring to FIGS. 3-4, since the insert 208 of the embodiment shown is received between the two sheets 204, 206 of composite material around its complete periphery, it is formed of at least two portions detachably interconnected together so as to be disengageable from between the sheets 204, 206 after cure. The insert 208 includes a central portion 218 defining a major part of the first mold surface 212 for molding the door skin 160, and a peripheral portion 220 extending around a complete perimeter of the central portion 218. The peripheral portion 220 is thus configured as a frame surrounding the central portion 218, and the central portion 218 engages the peripheral portion 220 to maintain it in the desired position in the assembly 200. In the embodiment shown, the peripheral portion 220 defines the whole of the second mold surface 214 of the insert, so that the second sheet 206 overlays the peripheral portion 220 without extending on the central portion 218. The edge 222 (FIG. 4) of the second sheet 206 bordering the free opening of the doorway is positioned on the peripheral portion 220, near the junction between the peripheral portion 220 and the central portion 218. Accordingly, only the peripheral portion 220 is received between the two sheets 204, 206 of composite material. The peripheral portion 220 is made of a plurality of interconnected parts which can be disconnected from each other to remove the peripheral portion 220 from between the two sheets 204, 206 of composite material after cure.

In a particular embodiment and referring to FIG. 4, the door skin 160, wall skin 180 and frame member 216 are manufactured in accordance with the following. First, the first sheet 204 of composite material is placed on the mold surface 210 of the mold plate 202 in uncured form. It is understood that the term "uncured" as used herein is intended to include materials that are partially cured to allow for handling, for example, "B-Stage" materials such as prepregs. Such partially cured materials are characterized herein as "uncured" since a cure cycle is necessary for the materials to achieve their final configuration and shape.

The insert 208 is disposed over the first sheet 204 with its first mold surface 212 overlaying and contacting the portion of the first sheet 204 corresponding to the door skin 160 and to the wall skin 180 around the periphery of the doorway 170.

The second sheet 206 of composite material is placed on the second mold surface 214 of the peripheral portion 220 of the insert 208 and over the first sheet 204 adjacent the insert 208 so as to form the frame member 216. The second sheet 206 of composite material is also in uncured form. In the embodiment shown, the second sheet 206 is placed around the complete periphery of the insert 208 so that the frame member 216 includes the sill, header and jambs. It is understood that alternatively, the second sheet 206 may be placed around only part of the periphery of the insert 208, for example, so as to define any one or any combination of sill, header and jamb(s).

It is understood that the composite materials forming the sheets 204, 206 can be placed using any suitable method, including, but not limited to, automated or hand layup of prepreg plies, and automated fiber deposition, with the two sheets 204, 206 being formed using the same method or using different methods. In a particular embodiment, the composite material forming the first sheet 204 is placed by automated fiber deposition, and the composite material forming the second sheet 206 is placed by manual layup of prepreg plies.

It is also understood that the mold surfaces 210, 212, 214 are suitably configured, for example, through prior application of a release agent, so that the composite materials can be disengaged therefrom once cured.

The sheets 204, 206 of composite materials are cured, for example, by heating the composite materials under pressure (e.g., in a pressurized atmosphere in an autoclave), for example, following the specifications provided by the manufacturer of the composite materials. During cure, the portions of the sheets 204, 206 in contact with each other adjacent the insert 208 are bonded together, so as to connect the frame member 216 to the wall skin 180 around the periphery of the doorway. It is understood that the sheets 204, 206, mold plate 202 and insert 208 are suitably prepared before the cure cycle, such as by vacuum bagging with suitable breather material and/or caul plate(s) or pressure pad(s); such preparation methods are well known in the art and will not be discussed further herein.

Once the composite materials are cured, the composite materials are disengaged from the mold plate 202, and the insert 208 is removed from between the two sheets 204, 206 of cured composite material. The removed insert 208 can be reused in the manufacture of another door skin and wall assembly. In the embodiment shown, the insert 208 is removed by first removing the central portion 218 of the insert 208, and then disconnecting and removing the pieces of the peripheral portion 220 from between the sheets 204, 206 of cured composite material.

The door skin 160 is then separated from the wall skin 180 using a cutting tool 224 displaced around the desired periphery of the door skin 160, through the first sheet 204 and without penetrating the second sheet 206. It can be seen from FIG. 4 that the path followed by the cutting tool 224 defines a perimeter which is smaller than the perimeter that was occupied by the insert 208 before its removal. The second sheet 206 and the first sheet 204 are accordingly spaced apart at the location where the cut is performed, so that the cutting tool 224 can cut the first sheet 204 without penetrating the second sheet 206. In a particular embodiment, the cutting tool 224 is a numerically controlled router; other suitable tools may alternatively be used. The cutting tool 224 simultaneously creates the perimeter edge 160' of the door skin 160 and the perimeter edge 170' of the doorway 170, thus ensuring that the shapes of the two will be complementary. The width W of the cutting tool 224 can be selected based on a desired difference between the dimensions of the doorway and door skin—a difference between the heights of the doorway and door skin and a difference between the widths of the doorway and door skin corresponding to twice the width W of the cutting tool 224.

Inner components of the door can then be attached to the door skin 160 to complete the door assembly, and additional components can be attached to the wall skin 180 to complete the wall assembly. Although not shown, additional components (in cured or uncured form) may also be attached to the door skin 160 and/or the wall skin 180 before cure, such as to be co-cured and/or co-bonded therewith during the cure cycle. In a particular embodiment, the thickness of the finished door is equal to or similar to the thickness t of the peripheral portion 220 of the insert 208, so that in use, the inner surface of the closed door abuts the frame member 216 while the outer skin 160 of the door is aligned with the skin 180 of the surrounding wall.

In a particular embodiment, the described method and assembly allow for the lay-up and cure of the rotorcraft doors in the same sequence as the surrounding fuselage skin, including the doors seat joggles defining the frame member. Accordingly, this may allow for a reduction in the number of trimming steps, a reduction of the number of tools (by eliminating the tools required for individual door skin manufacturing) and/or a reduction of labor hours when compared to the prior separate manufacture of the door skin and fuselage wall. In a particular embodiment, the simultaneous manufacture of the door skin and wall provides for a better joint line between the door and fuselage wall, which may result in a tighter and better sealed door and/or a more esthetically pleasing look when compared to the prior separate manufacture of the door skin and fuselage wall.

It is understood that the particular mold plate 202 and insert 208 described and shown are configured for a particular rotorcraft 100 and that the geometry can be adapted to suit any configuration of door skin and wall including a corresponding doorway, including, but not limited to, such door and wall assemblies in aerospace, boats, automobiles, etc.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of manufacturing a door skin of a door and a fuselage wall having a doorway configured to receive the door, the fuselage wall including a member extending into the doorway for abutting the door, the method comprising:
   placing a first sheet of uncured composite material on a mold plate to define the door skin and a skin of the fuselage wall around the doorway;
   disposing an insert over the first sheet, the insert overlapping a desired periphery of the door;
   placing a second sheet of uncured composite material on a peripheral portion of the insert and over the first sheet adjacent the peripheral portion of the insert to form the member;

curing the first and second sheets, the first and second sheets bonding together adjacent the peripheral portion of the insert during the cure;

after the cure, removing the insert from between the first and second sheets; and after the cure, separating the door skin from the skin of the fuselage wall by moving a cutting tool through the first sheet and without penetrating the second sheet, the cutting tool moving around the desired periphery of the door.

2. The method according to claim 1, wherein the member is a frame member including a sill, a header, and opposed jambs.

3. The method according to claim 1, wherein the insert includes a central portion, the peripheral portion forming a closed perimeter extending around the central portion, the peripheral and central portions being detachably interconnected, the peripheral portion including a plurality of interconnected parts.

4. The method according to claim 3, wherein the second sheet is placed on the peripheral portion without overlaying the central portion.

5. The method according to claim 1, wherein placing the second sheet on the peripheral portion of the insert and over the first sheet adjacent the peripheral portion is performed around a complete perimeter of the peripheral portion.

6. The method according to claim 1, wherein curing the first and second sheets is performed by heating the first and second sheets in a pressurized atmosphere.

7. The method according to claim 1, wherein placing the first sheet is performed by automated fiber deposition.

8. The method according to claim 1, wherein moving the cutting tool is performed by moving a numerically controlled router through the first sheet around the desired periphery of the door.

9. A method of manufacturing a door skin of a door and a wall having a doorway configured to receive the door, the wall including a member extending into the doorway for abutting the door, the method comprising:

placing a first composite material on a mold plate configured to define a first surface of the door skin and of a skin of the wall, the first composite material being uncured;

disposing an insert on the first composite material with a first mold surface of the insert against the first composite material, the first mold surface configured to define a second surface of the door skin, the insert having an opposed second mold surface configured to define the member, the insert overlapping a desired periphery of the door;

disposing a second composite material on the second mold surface of the insert and on the first composite material adjacent the insert, the second composite material being uncured;

curing the first and second composite materials to respectively form first and second cured sheets, wherein contacting portions of the first and second composite materials bond together during cure;

removing the insert from between the first and second cured sheets; and separating the door skin from the skin of the wall by moving a cutting tool through the first cured sheet and without penetrating the second cured sheet, the cutting tool moving around the desired periphery of the door.

10. The method according to claim 9, wherein the insert includes a central portion and a peripheral portion extending around the central portion and detachably connected thereto, the peripheral portion including a plurality of interconnected parts.

11. The method according to claim 10, wherein the second mold surface of the insert is defined by the peripheral portion and extends around a complete perimeter of the peripheral portion, the second composite material being placed on the second mold surface and on the first composite material adjacent the second mold surface around the complete perimeter of the peripheral portion.

12. The method according to claim 10, wherein the second material is placed on the insert without overlaying the central portion.

13. The method according to claim 9, wherein placing the first composite material is performed by automated fiber deposition.

14. The method according to claim 9, wherein moving the cutting tool is performed by moving a numerically controlled router around the desired periphery of the door through the first cured sheet.

* * * * *